United States Patent [19]
Brandt

[11] 3,878,446
[45] Apr. 15, 1975

[54] CURRENT REGULATOR FOR D.C. MOTORS

[75] Inventor: Arnold W. Brandt, Milford, Mich.

[73] Assignee: Burroughs Corporation, Detroit, Mich.

[22] Filed: Mar. 29, 1973

[21] Appl. No.: 345,844

[52] U.S. Cl. .............................. 318/317; 318/331
[51] Int. Cl. .............................................. H02p 5/06
[58] Field of Search ........................... 318/331, 317

[56] References Cited
UNITED STATES PATENTS

| | | | |
|---|---|---|---|
| 3,316,472 | 4/1967 | Taylor | 318/331 |
| 3,373,331 | 3/1968 | Dow | 318/317 X |
| 3,396,323 | 8/1968 | Auld | 318/331 |
| 3,488,756 | 1/1970 | Skrivanek, Jr. | 318/331 |
| 3,532,951 | 10/1970 | Hovance | 318/331 |
| 3,568,027 | 3/1971 | Bacon | 318/331 |
| 3,601,673 | 8/1971 | Mason | 318/317 X |
| 3,604,996 | 9/1971 | Lutz | 318/331 X |
| 3,808,482 | 4/1974 | Wagensonner et al. | 318/331 X |

*Primary Examiner*—B. Dobeck
*Attorney, Agent, or Firm*—Leon E. Redman; Michael B. McMurry; Edwin W. Uren

[57] ABSTRACT

Disclosed is a circuit for regulating a d.c. motor that makes use of the inductive reactance of the motor and utilizes a switching regulator to regulate the current to the motor. This system has the advantage of allowing the transistors of the servo amplifier to be in either fully on or fully off condition thereby reducing the power dissipation within the amplifier.

1 Claim, 2 Drawing Figures

CURRENT REGULATOR FOR D.C. MOTORS

BACKGROUND OF THE INVENTION

In conventional servo systems servo amplifiers provide a regulated voltage to the motor terminals wherein the voltage is determined by signals fed into a current detecting element. Since such voltage regulating systems require substantially linear operations within the servo amplifier, there results a requirement for high power dissipation within the amplifier thereby creating the need for physically large heat sinks. In addition, the reliability of the amplifier elements due to high power stress levels is reduced. It is possible to connect a servo amplifier in a current regulating mode but the requirement for high power dissipation with the attendant problems still occurs.

In order to overcome the disadvantages of the prior art servo amplifiers, the disclosed circuit was developed to provide a servo amplifier in which the output transistors are either fully on or fully off. In addition the servo amplifier disclosed makes use of the servo motor's natural inductance as an aid in current regulation.

SUMMARY OF THE INVENTION

It is accordingly an important object of the invention to provide a means of regulating a servo motor utilizing current regulation wherein the servo amplifier is either in a fully on or fully off condition.

It is an additional object of the invention to provide a method of regulating a servo motor utilizing the inductance of the servo motor.

The inventive circuitry as disclosed herein contains a bistable comparator to measure the relative value of the combination of an input voltage, or signal, and a feedback signal to a reference voltage. A plurality of switching elements that are responsive to the state of the comparator are also included. These switching elements will allow the application of a positive voltage or power to the motor when the comparator is in one state and at the same time will cut off the voltage to the motor when the comparator is in the other state. There is in addition a bypass circuit that permits current to flow through the motor when the input voltage has been cut off. In addition there is a feedback portion of the circuit from the motor to the comparator that indicates when the current of the motor has dropped below a certain value.

When the motor has reached the desired speed, the motor current will generate a sufficient voltage on the feedback element so as to cause the comparator to change state thereby cutting off the source voltage to the motor. The inductive reactance of the motor will keep the current flowing in the bypass circuit thereby maintaining a voltage on the feedback portion until the current through the motor declines to the point that will cause the comparator to again change state. It is in this manner that the current regulation of the motor is accomplished utilizing the inductance characteristics of the motor.

DETAILED DESCRIPTION OF THE INVENTION

Figure 1:
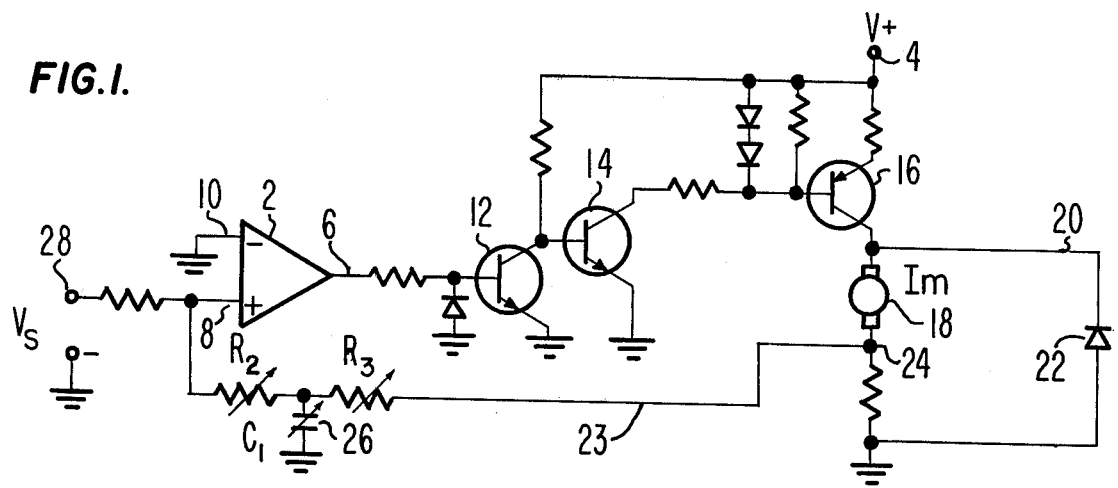
FIG. 1 is a schematic diagram of the servo motor regulation circuitry.

The circuitry illustrated in FIG. 1 represents the preferred embodiment of the invention. The bistable comparator circuit 2 is used to ultimately control the voltage source 4. The comparator 2 will have a positive output on line 6 when the voltage at input terminal 8 is greater than the voltage at input terminal 10. Similarly, the comparator will produce a low voltage, zero volts or below, on line 6 when the voltage on input terminal 8 is less than the voltage on input terminal 10. It can therefore be seen from the circuit diagram of FIG. 1 that the comparator will be responsive to the voltage applied at terminal 8.

In addition there is switching circuit for connecting and disconnecting the voltage source 4 to the motor which consists of a staged network of transistors.

When the output of the comparator 2 produces a low value on line 6, the transistor 12 will be non-conducting. If transistor 12 is non-conducting, the transistor 14 will be in a conducting state placing the transistor 16 in a conducting state. At this point, when transistor 16 is in a conducting state, the voltage source 4 is in effect applied to the motor 18. By the same token when the comparator 2 places a high value on line 6 a transistor 12 will be in a conducting state causing transistor 14 to go to a non-conducting state. This will tend to block transistor 16 thereby effectively removing the voltage source 4 from the motor 18.

There is also provided in the preferred embodiment a bypass circuit 20 around the motor 18 so that when the voltage source 4 is cut off by the transistor 16 current may still flow through the motor. This bypass circuit 20 contains the diode 22 to prevent current leakage past the motor when the voltage source 4 is connected to the motor. It therefore can be seen from the circuitry diagram of FIG. 1 that current will continue to flow through terminal 24 of the motor after the voltage source has been cut off.

The circuit is also provided with a feedback portion 23 that connects terminal 24 of the motor 18 to the input terminal 8 of the comparator. This feedback portion includes the capacitor $C_1$ at 26 to prevent the control circuit from changing state at too rapid a rate.

Figure 2:
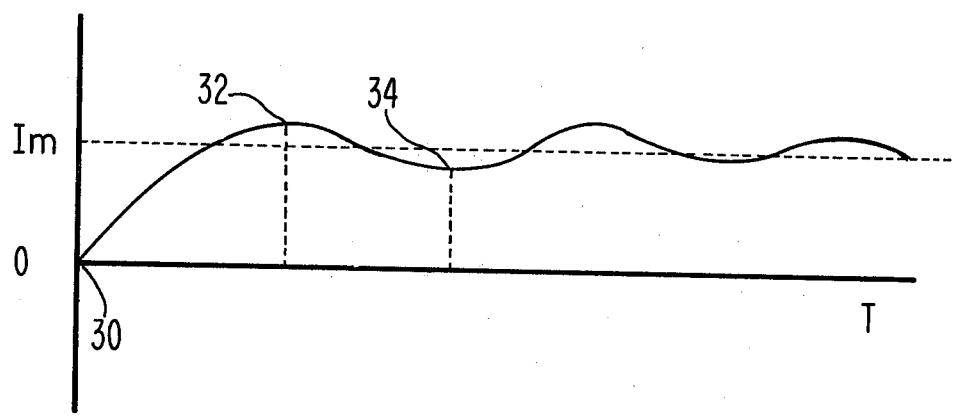
FIG. 2 is a graph showing the time versus current characteristics of the servo motor.

In order to aid in the description of the operation of the invention, the graph in FIG. 2 has been provided. Here the servo motor current is plotted against time for the start and the subsequent steady state operation of the circuitry in FIG. 1. In terms of operation, the circuitry in FIG. 1 will generally respond to overall control voltage $V_s$ placed on terminal 28. Since this is a negative voltage, the comparator 2 will produce a low signal on line 6 which will, as explained above, cause the voltage source 4 to be connected to the motor 18. This is equivalent to point 30 in FIG. 2. When the constant voltage source 4 is applied to the motor, the motor current will increase tending to produce a positive voltage on terminal 8 of the comparator through the feedback portion 23. When the motor current reaches the desired value at point 32 of FIG. 2, the voltage generated at terminal 8 of the comparator will be sufficient to cause the comparator to produce a positive state on line 6 thereby in effect disconnecting the voltage source 4 from the motor. Since the bypass circuit 20 has been provided, the motor will continue to produce current on the bypass circuit due to its inductive nature. As the motor gradually slows down the voltage produced at terminal 8 of the comparator will drop until it is below the reference voltage at terminal 10 thereby causing the comparator to again change states. The second change of state of the comparator is indicated by point 34 on the graph of FIG. 2. It now should become apparent from the above description of the operation of the circuitry of FIG. 1 and the graph of FIG. 2 that the operation of the comparator 2 in co-operation with the rest of the circuitry of FIG. 1 will tend to keep the motor current constant. In addition no external components are required for the current regulator and that the switching rate, the time between point 32 and point 34 of FIG. 2 is proportional to the time determined by the equation:

$$T = \frac{R_2 \cdot R_3}{R_2 + R_3} C_1$$

The time constant $T$ may be varied by changing the values of the resistors $R_2$ and $R_3$ and the capacitor $C_1$.

In summary, by making use of the inductive nature of a servo motor, this invention permits the construction of a servo motor control wherein the circuit elements, in the preferred embodiment, the transistors 12, 14 and 16 are either in an on or off state thereby substantially reducing the power dissipation requirements of these circuit elements.

What is claimed is:

1. A motor control circuit comprising:

a bistable comparator circuit for comparing a single voltage representation of the motor current to a reference voltage;

transistor switching means responsive to said bistable comparator circuit for connecting and disconnecting a power source to the motor;

current bypass means for allowing the current generated by the inductive reactance of the motor to flow back through the motor when the power source has been disconnected; and feedback means, including a pair of series connected viarable resistors connected in series directly between said bistable comparator circuit and said motor, and a variable capacitor connected in common with said first and second variable resistors, for governing the switching rate of said bistable comparator circuit in accordance with the equation.

$$T = \frac{R_2 \cdot R_3}{R_2 + R_3} C_1$$

T representing the time between said disconnecting and said connecting, $R_2$ representing the resistance of either of said pair of variable resistors, $R_3$ representing the resistance of the other of said variable resistors, and $C_1$ representing the capacitance of said variable capacitor.

* * * * *